United States Patent
Brazas

(10) Patent No.: US 7,114,835 B2
(45) Date of Patent: Oct. 3, 2006

(54) HEADLAMP ADJUSTER

(75) Inventor: Peter B. Brazas, Baroda, MI (US)

(73) Assignee: Illinois Tool Works, Inc., Glenview, IL (US)

( * ) Notice: Subject to any disclaimer, the term of this patent is extended or adjusted under 35 U.S.C. 154(b) by 41 days.

(21) Appl. No.: 11/082,311

(22) Filed: Mar. 17, 2005

(65) Prior Publication Data

US 2005/0276060 A1 Dec. 15, 2005

Related U.S. Application Data

(60) Provisional application No. 60/578,635, filed on Jun. 10, 2004.

(51) Int. Cl.
*B60Q 1/06* (2006.01)
*F21V 21/14* (2006.01)
*G01B 21/22* (2006.01)

(52) U.S. Cl. .................. 362/460; 362/424; 362/514; 362/524

(58) Field of Classification Search ............ 362/424, 362/460, 514, 524
See application file for complete search history.

(56) References Cited

U.S. PATENT DOCUMENTS

| | | | |
|---|---|---|---|
| 4,524,638 A * | 6/1985 | Van Hee | 74/606 R |
| 5,079,676 A | 1/1992 | Lisak | 362/61 |
| 5,260,857 A * | 11/1993 | Lukkarinen et al. | 362/528 |
| 5,573,326 A * | 11/1996 | Iijima | 362/460 |
| 6,474,850 B1 * | 11/2002 | Burton | 362/460 |
| 2003/0002290 A1 | 1/2003 | Burton | 362/460 |

* cited by examiner

*Primary Examiner*—Sandra O'Shea
*Assistant Examiner*—James W Cranson, Jr.
(74) *Attorney, Agent, or Firm*—Mark W. Croll; Paul F. Donovan

(57) ABSTRACT

A headlamp adjuster is provided for use and access from the front of a headlamp assembly on which it is installed. The adjuster includes an input shaft and an output screw in substantially parallel, spaced arrangement. A gear train drivingly connects inner ends of the input shaft and the output screw. Rotation of the input shaft about its longitudinal axis causes axial translation of the output screw.

20 Claims, 2 Drawing Sheets

HEADLAMP ADJUSTER

CROSS-REFERENCE TO RELATED APPLICATIONS

This Non-Provisional Application claims the benefits of U.S. Provisional Application Ser. No. 60/578,635, filed Jun. 10, 2004.

FIELD OF THE INVENTION

The present invention relates to adjustment mechanisms and, more particularly, the invention relates to adjustment mechanisms useful for adjusting the aim of motor vehicle headlights in vehicles having limited access above and behind the headlamp.

BACKGROUND OF THE INVENTION

Headlamps on motor vehicles require proper aiming, both vertically and horizontally, for safe and optimal performance. From time-to-time, it is necessary to readjust the aim of vehicle headlamps. If the headlamp is not properly adjusted vertically, the headlamp may focus the light too close to the vehicle, not adequately lighting the distance. If the field of light is too short, objects might not be illuminated soon enough for a driver to react to the presence of the object, even if the vehicle is being operated within legal speed limits. Conversely, if the headlamp is aimed to direct the light too far in the distance, the area in front of the vehicle may not be properly illuminated for adequate recognition of something in front of the vehicle. Further, a headlamp aimed too distant may "blind" an oncoming driver even in the dimmed or "low-beam" condition.

Proper horizontal adjustment is just as important as proper vertical adjustment. If the headlamp is aimed to direct the beam of light too far to the left, oncoming drivers can be blinded. If focused too far left to the right, the primary field directly in front of the automobile may not be properly illuminated. Improperly directed headlamps can be distracting and unsafe.

Modern vehicle styling and design uses adjustable reflectors that are pivotable about both horizontal and vertical axes to direct the light from the headlamp. Known adjusters for such headlamp assemblies are geared devices operating at right angles. The adjusters are positioned above or behind the reflector and are accessed from the engine compartment to engage a tool and operate the adjuster. Such mechanisms work effectively when the headlamp assembly is positioned to provide ample space behind or above by which the adjuster can be accessed.

In some modern aerodynamic styles, sports utility vehicles and the like, the headlamp assemblies are incorporated into fenders designs that provide little or no access from above, below or behind the headlamp assembly. In such vehicles, headlamp adjusters must be accessed from in front of the headlamp assembly. A known design for front access adjustment has a base housing with channels to accept a sliding member with rails. The sliding member holds a fixed ball stud which protrudes into the lamp, engaging the reflector. An input shaft, accessible from the front of the lamp, is snapped into the base housing and is threadedly engaged with the sliding member. Rotation of the input shaft causes the sliding member to advance along the channels in the base housing. An adjuster of this type is relatively bulky, difficult to install and expensive to manufacture and assemble.

What is needed is a front operated headlamp adjuster having a simplified design and construction that is easy to manufacture and install, and easy and effective in operation.

SUMMARY OF THE INVENTION

The present invention provides a headlamp adjuster that has a rotatable input shaft accessible from the front of the headlamp assembly and an output screw substantially parallel to the input shaft, with a gear train operatively engaged with inner ends of the input shaft and output screw.

In one aspect thereof, the present invention provides a headlamp adjuster with a gear train having an input gear and an output gear drivingly connected. An input shaft has a first end adapted for driving engagement to rotate the shaft, and a second end connected to the input gear of the gear train for rotation of the input gear upon rotation of the input shaft. An output screw connected to the output gear of the gear train is adapted for axial movement upon rotation of the output gear. The output screw is in substantially parallel and spaced relation to the input shaft.

In another aspect thereof, the present invention provides A headlamp assembly with a headlamp reflector; a rotatable input shaft and a nonrotatable output screw substantially parallel to the input shaft. The output screw has an outer end connected to the reflector in a connection inhibiting rotation of the output screw. A gear train drivingly connects the input shaft and the output screw, and is configured for translating rotation of the input shaft to axial translation movement of the nonrotatable output screw.

In a still further aspect thereof, the present invention provides a headlamp adjuster with an output gear defining an axial bore therethrough, the bore having threads therein. An input gear is drivingly connected to the output gear. A nonrotatable output screw has a threaded portion threadedly engaged with the threads of the bore in the output gear. The output screw has a distal end configured for attachment to a headlamp component. An input shaft is drivingly connected to the input gear for rotation of the input gear upon rotation of the input shaft. A drive end of the input shaft is on a same side of the drive gear and the input gears as the distal end of the output screw.

An advantage of the present invention is providing a headlamp adjuster that can be positioned for access from the front of the headlamp, and that is easy to install and operate.

Another advantage of the present invention is providing a headlamp adjuster accessible from the front of the headlamp that can be modified easily to conform to different styles and configurations of headlamp assemblies.

Other features and advantages of the invention will become apparent to those skilled in the art upon review of the following detailed description, claims and drawings in which like numerals are used to designate like features.

Figure 1:
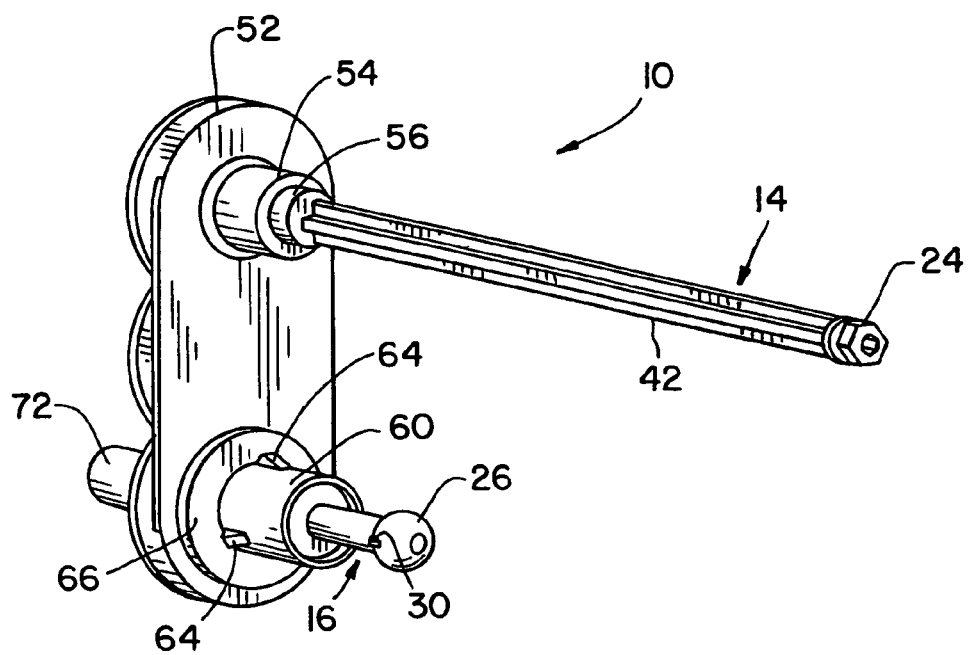
FIG. 1 is a perspective view of a headlamp adjuster in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a headlamp adjuster 10 in accordance with the present invention is shown, suitable for connection to a headlamp reflector 12 (FIG. 3) and for operation from the front of the headlamp reflector. Advantageously, headlamp adjuster 10 can be made of plastic or, alternatively, of other non-corrosive material such as zinc, stainless steel or the like. As a further alternative, inexpensive metals also can be used for some or all of the components to be described hereinafter.

Adjuster 10 includes an input shaft 14, an output screw 16 and a gear train 18 operatively connecting input shaft 14 to output screw 16. A housing 20 including a cover 22 is provided for enclosing gear train 18 and inner ends of input shaft 14 and output screw 16.

Input shaft 14 is an elongated body having a first or drive end 24 configured for engaging a tool by which input shaft 14 can be rotated about its longitudinal axis. Those skilled in the art will readily understand that drive end 24 can be configured in a variety of structures for engaging one or several different types of tools or implements for rotating input shaft 14. Thus, drive end 24 can be externally configured to be received in a socket, nut driver, wrench or other tool and/or may have an internal cavity configured for receiving a screwdriver, wrench or other drive tool or implement. A second end of input shaft 14, opposite drive end 24, is connected to gear train 18, as will be described more fully hereinafter.

Figure 2:
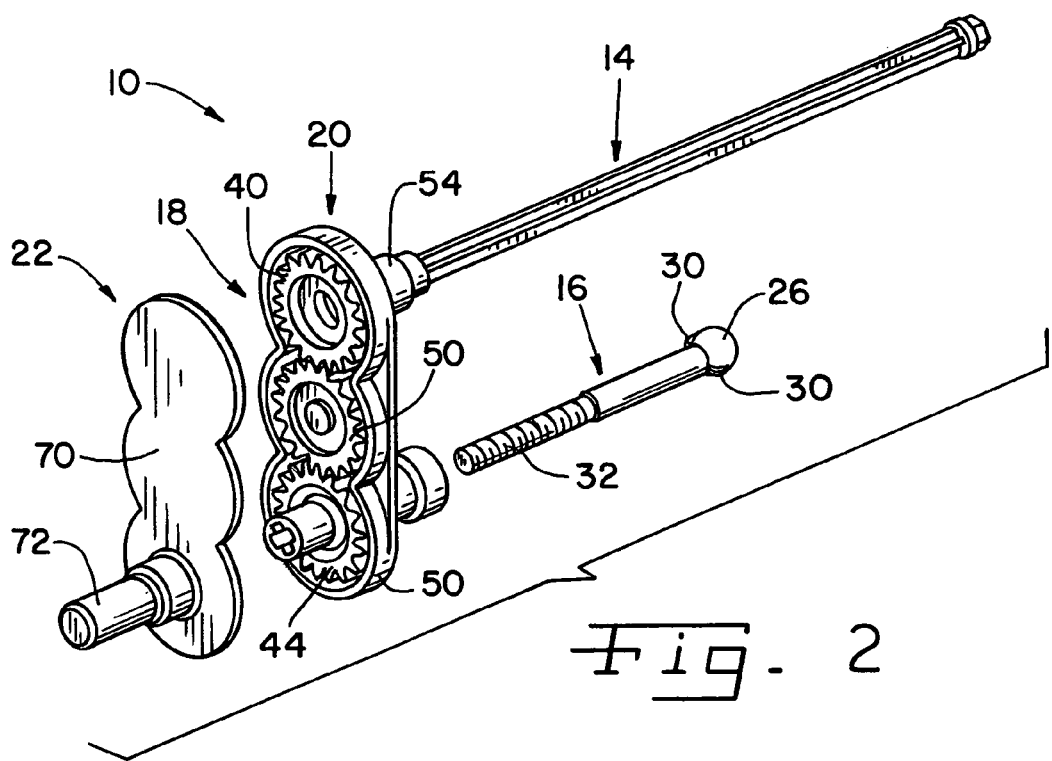
FIG. 2 is a partially exploded view of the headlamp adjuster shown in FIG. 1.

Output screw 16 is an elongated body substantially parallel to and spaced from input shaft 14. Output screw 16 includes a distal bulbous end 26 received in a pocket 28 or other structure of reflector 12 whereby output screw 16 is inhibited against rotation about its longitudinal axis and by which axial translation inwardly and outwardly of output screw 16 is transferred to reflector 12. Bulbous end 26 includes one or more tabs or ears 30 received in pocket 28 such that the cooperative association of ears 30 and pocket 28 inhibit rotation of output screw 16 about its longitudinal axis. As seen most clearly in FIG. 2, output screw 16 further includes a threaded inner end 32 which may extend the length of output screw 16 to near bulbous end 26 or may be some lesser portion thereof near the opposite end of output screw 16 from bulbous end 26. Threaded portion 32 can commence at the distal tip of output screw 16 opposite bulbous end 26 or some distance inwardly thereof.

Figure 3:
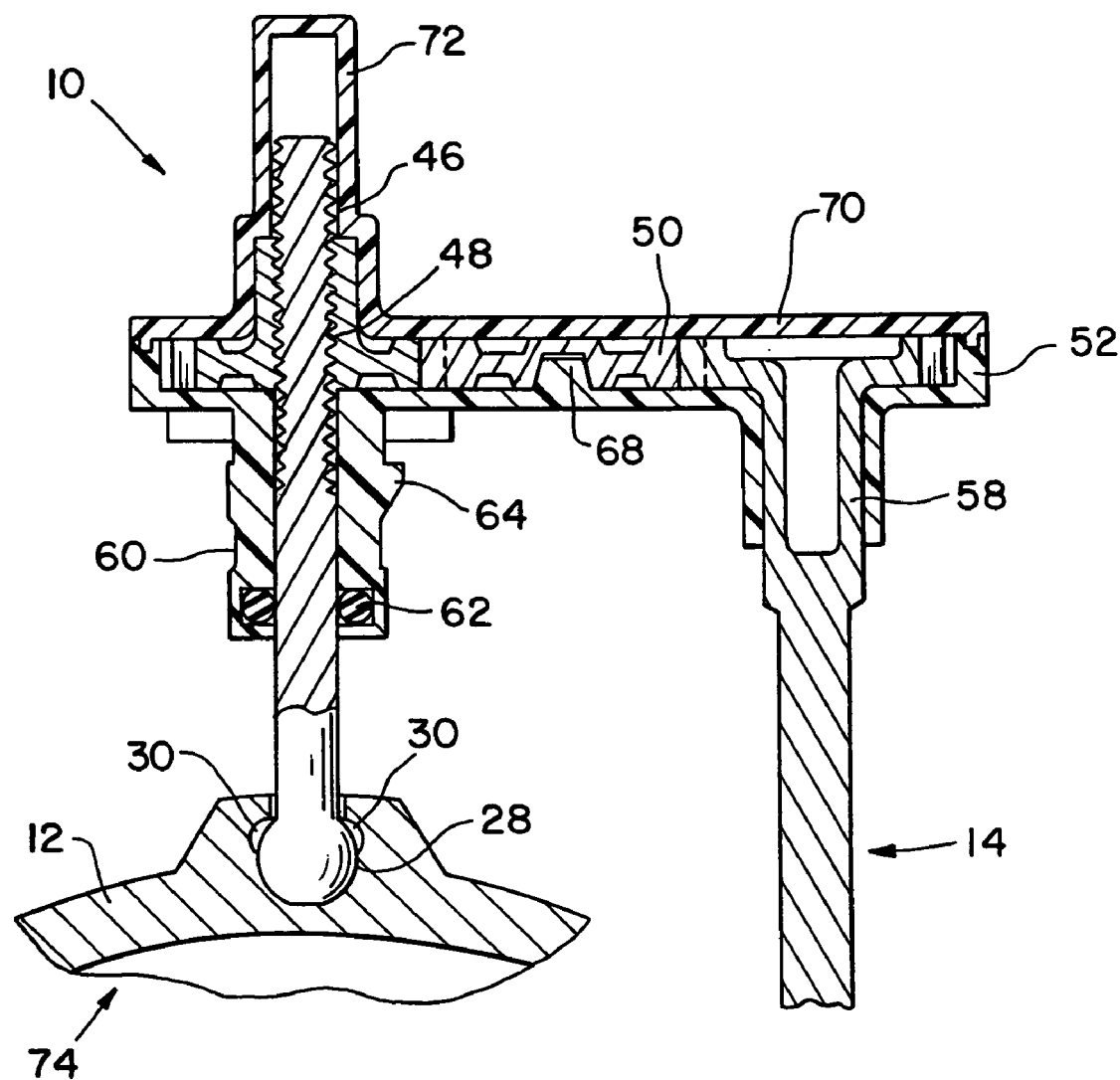
FIG. 3 is a cross-sectional view of a headlamp adjuster in accordance with the present invention, illustrating the adjuster connected to a headlamp reflector.

Gear train 18 operative connects the inner ends of input shaft 14 and output strew 16. Gear train 18 includes an input gear 40, such as a spur gear, either integral with or fixedly mounted to input shaft 14. Those skilled in the art will readily understand that input gear 40 can be a separate component mounted on input shaft 14 so that rotation of input shaft 14 about its longitudinal axis causes rotation of input gear 40. Thus, shaft 14 can be provided with a suitable external configuration, such as longitudinal flutes 42, by which a driving connection is made to a complementarily configured bore of input gear 40. Other drive connection configurations for input shaft 14 and input gear 40 also are suitable. Alternatively, as shown in FIG. 3, input gear 40 can be formed as a portion of a monolithic body that also includes input shaft 14.

Gear train 18 further includes an output gear 44 operatively disposed on output screw 16. Output gear 44 defines an axial bore 46 therethrough having internal threads 48 received and engaged with threaded portion 32 of output screw 16. Output gear 44 is otherwise suitably configured, such as a spur gear having external teeth of conventional design.

In the exemplary embodiment shown in the drawings, gear train 18 further includes an idler gear 50, such as a spur gear operatively engaged with and between input gear 40 and output gear 44. While one idler gear 50 is shown, those skilled in the art will understand readily that two or more idler gears 50 also can be used as necessary to increase the distance between input shaft 14 and output screw 16. Further, input gear 40 can be engaged directly with output gear 44, without the use of an idler gear 50 therebetween, when adequate separation between input shaft 14 and output screw 16 is provided by the radius dimensions of input gear 40 and output gear 44.

Housing 20 includes a box-like base structure 52 configured for containing gear train 18 therein, and for receiving inner ends of input shaft 14 and output screw 16. Accordingly, base structure 52 can define a cylindrical projection 54 for rotatably receiving therein an extension 56 of input gear 40 configured for receiving input shaft 14 therein. Alternatively, as shown in FIG. 3, projection 54 can be configured for receiving rotatably therein a shoulder portion 58 of a monolithic input shaft 14 and input gear 40.

Housing 20 further defines a cylindrical sleeve 60 configured for slidably receiving therein output screw 16. Sleeve 60 can be configured for holding an O-ring or other seal 62 slidably engaging output screw 60, providing a substantially sealed relationship so that moisture and other contaminants do not infiltrate housing 20 to potentially foul gear train 18 or disrupt the sliding movement of output screw 16 relative to sleeve 60. On the external surface thereof, sleeve 60 defines one or more locking tabs 64 by which adjuster 10 can be secured to a frame or other structure (not shown). Tabs 64 can be provided to lock in place with a ramp-like effect upon a slight turn of adjuster 10 upon proper positioning with the frame or other structure not shown. A gasket 66 on sleeve 60 inwardly of tabs 64 is compressed upon installation of adjuster 10 and provides resilient force for securing adjuster 10 in the locked position.

Housing 20 further defines a boss 68 for rotatably receiving idler gear 50. A separate boss 68 is provided for each idler gear 50, and when no idler gears 50 are used, no bosses 68 are required.

Cover 22 includes a substantially flat panel 70 to enclose the open end of housing 20. A cylindrical receiver 72 is configured and positioned in substantial axial alignment with output screw 16, to accommodate the axial translation of output screw 16.

FIG. 3 illustrates adjuster 10 installed in a headlamp assembly 74 that further includes the aforedescribed reflector 12. In use of adjuster 10, bulbous end 26 is secured in pocket 28, with ears 30 thereof secured in such a manner as to prevent rotation of output screw 16 about its longitudinal axis. A tool or other implement is engaged with drive end 24 and turned to rotate input shaft 14 about its longitudinal axis. Input gear 40 is caused to rotate together with input shaft 14.

With idler gear 50 drivingly engaged between input gear 40 and output gear 44, rotation of input gear 40 is transferred to output gear 44. With threaded portion 32 of output screw 16 threadedly engaged with threads 48 in bore 46 of output gear 44, and with output screw 16 inhibited against rotation about its longitudinal axis, output screw 16 is caused to translate axially inwardly and outwardly relative to housing 20 when input shaft 14 is rotated. The direction that output screw moves, either inwardly or outwardly relative to housing 20, depends on the orientation of the mating threaded portions of output screw 16 and output gear 44 and the rotational direction transferred to output gear 44. As output screw 16 moves inwardly or outwardly relative to housing 40, it pushes or pulls on reflector 12 to adjust the tilt thereof and consequently the orientation and direction of light from the headlamp assembly in which it operates. Cylindrical receiver 72 is of sufficient length to accommodate the inward extreme position for output screw 16.

As mentioned previously, the present invention can be configured easily to accommodate particular configurations of a variety of vehicles and headlamp assemblies. The lengths of input shaft 14 and output screw 16 can be selected as required for particular uses. The center distance between input shaft 14 and output screw 16 can be varied by selecting and configuring the diameters of input gear 40 and output gear 44 and by the use or non-use of an idler gear or idler gears 50 between input gear 40 and output gear 44.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A headlamp adjuster comprising:
   a gear train having an input gear and an output gear drivingly connected;
   an input shaft having a first end adapted for driving engagement to rotate said shaft and a second end connected to said input gear of said gear train for rotation of said input gear upon rotation of said input shaft; and
   an output screw connected to said output gear of said gear train and adapted for axial movement upon rotation of said output gear, said output screw being in substantially parallel and spaced relation to said input shaft.

2. The adjuster of claim 1, said gear train including an idler gear drivingly connected to said input gear and to said output gear for conveying rotation of said input gear to rotation of said output gear.

3. The adjuster of claim 1, said output screw having a threaded portion and said output gear defining an axial bore having threads therein adapted for threaded engagement with said threaded portion of said output screw.

4. The adjuster of claim 1, said output screw having a distal end adapted for non-rotating connection to a headlamp reflector.

5. The adjuster of claim 4, said distal end being of substantially bulbous shape.

6. The adjuster of claim 5, said substantially bulbous end having an ear thereon.

7. The adjuster of claim 1, said gear train contained within a substantially sealed housing.

8. The adjuster of claim 7, said housing including a cylindrical receiver for accommodating axial translation of said output screw.

9. The adjuster of claim 7, said housing having locking tabs for connecting said adjuster in a headlamp assembly.

10. The adjuster of claim 9, said housing including a cylindrical receiver for accommodating axial translation of said output screw.

11. A headlamp assembly comprising;
    a headlamp reflector;
    a rotatable input shaft;
    a nonrotatable output screw substantially parallel to said input shaft, and having an outer end connected to said reflector in a connection inhibiting rotation of said output screw; and
    a gear train drivingly connecting said input shaft and said output screw, said gear train configured for translating rotation of said input shaft to axial translation movement of said nonrotatable output screw.

12. The headlamp assembly of claim 11, said gear train including an input gear directly connected to said input shaft for rotation by rotation of said input shaft and an output gear drivingly connected to said output screw.

13. The headlamp assembly of claim 12, said gear train including an idler gear drivingly connected to said input gear and to said output gear.

14. The headlamp assembly of claim 12, said output gear defining a threaded opening therethrough, and said output screw having a threaded end threadedly connected to said threaded opening in said output gear.

15. The headlamp assembly of claim 14, said gear train including an idler gear drivingly connected to said input gear and to said output gear.

16. A headlamp adjuster comprising:
    an output gear defining an axial bore therethrough, said bore having threads therein;
    an input gear drivingly connected to said output gear;
    a nonrotatable output screw having a threaded portion threadedly engaged with said threads of said bore in said output gear, said output screw further having a distal end configured for attachment to a headlamp component; and
    an input shaft drivingly connected to said input gear for rotation of said input gear upon rotation of said input shaft, said input shaft having a drive end on a same side of said drive gear and said input gear as said distal end of said output screw.

17. The headlamp adjuster of claim 16, including an idler gear drivingly connected to said output gear and to said input gear.

18. The headlamp adjuster of claim 16, said drivel end of said input shaft configured for engagement with a drive tool for rotating said input shaft.

19. The headlamp adjuster of claim 16, including a substantially sealed housing containing said gears.

20. The headlamp adjuster of claim 19, said housing having locking tabs configured for connection to a headlamp assembly.

* * * * *